Oct. 21, 1924.
E. J. COOK
1,512,676
AXLE CONSTRUCTION
Filed Aug. 28, 1920
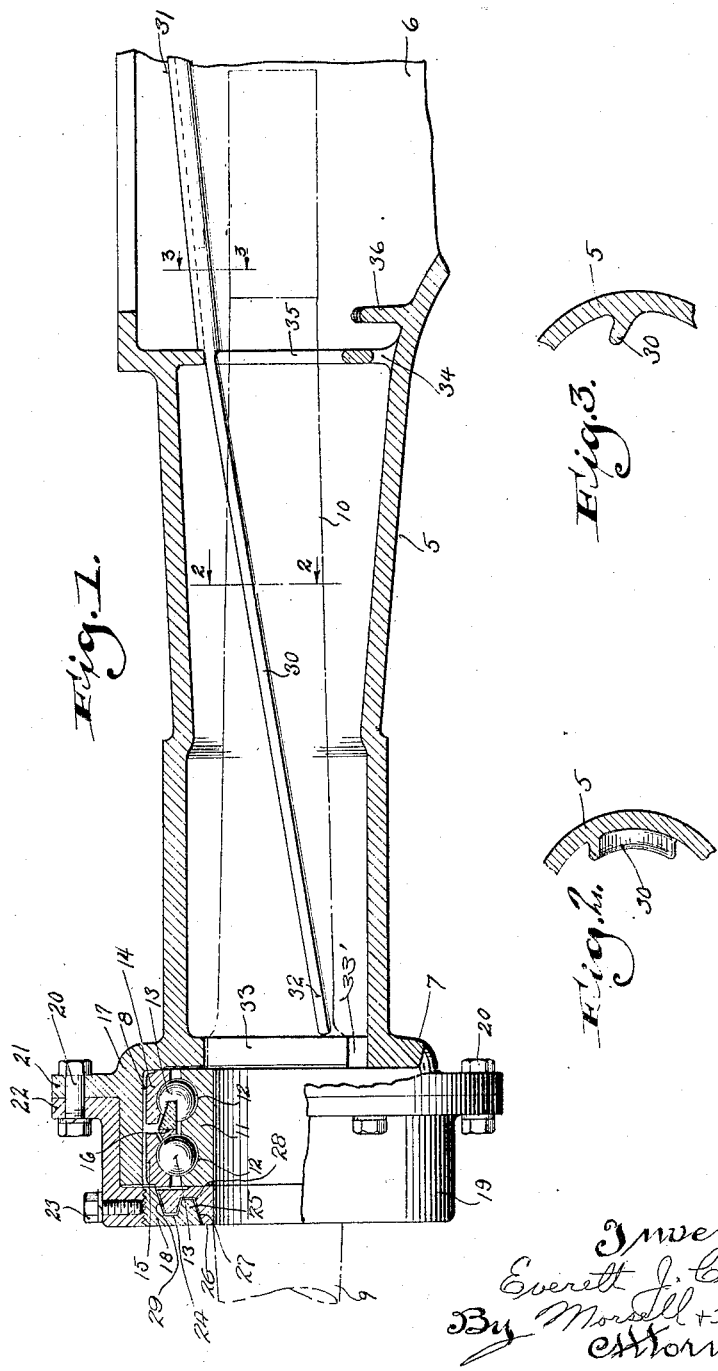

Patented Oct. 21, 1924.

1,512,676

UNITED STATES PATENT OFFICE.

EVERETT J. COOK, OF OSHKOSH, WISCONSIN, ASSIGNOR OF ONE-HALF TO WISCONSIN PARTS COMPANY, OF OSHKOSH, WISCONSIN, A CORPORATION OF WISCONSIN.

AXLE CONSTRUCTION.

Application filed August 28, 1920. Serial No. 406,721.

*To all whom it may concern:*

Be it known that I, EVERETT J. COOK, a citizen of the United States, and resident of Oshkosh, in the county of Winnebago and State of Wisconsin, have invented new and useful Improvements in Axle Constructions, of which the following is a description, reference being had to the accompanying drawings, which are a part of this specification.

This invention relates to certain new and useful improvements in axle construction and refers more particularly to the axle housing per se.

It is one of the objects of this invention to provide an axle housing having means for catching lubricant splashed by the usual differential worm drive gear and feeding the same to the axle journals positioned at or near the outer ends of the housing.

This invention has for another of its objects to provide troughs cast integral with the axle housing and their inner ends positioned within the differential portion of the housing and their outer ends on a lower plane than their inner ends and positioned adjacent the bearings of the axle for feeding lubricant splashed by the differential gear to the axle bearings.

Another object of this invention is to provide means for permitting the return of excess lubricant from the axle bearings to the differential compartment of the housing and having deflector means for preventing the splashing of the lubricant in the differential compartment outwardly into the axle enclosing portions of the housing.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawing, I have illustrated one complete example of the physical embodiment of my invention constructed according to the best mode I have so far devised for the practical application of the principles thereof, and in which:

Figure 1 is a view part in section and part in elevation taken through one side of a rear axle housing embodying my invention;

Figure 2 is an enlarged fragmentary sectional view taken on the line 2—2 of Figure 1; and Figure 3 is an enlarged fragmentary view taken on the line 3—3 of Figure 1.

Referring now more particularly to the accompanying drawing, the numeral 5 designates one end or half of a power driven vehicle rear axle housing which tapers outwardly toward its center to provide a differential or worm gear compartment 6 and has its outer smaller ends enlarged as at 7 to form bearing compartments 8. As usual in constructions of this character, both ends of the axle housing are identical, and therefore but one end is illustrated in the accompanying drawing and the description will be confined to the singular.

Positioned within the axle housing and having one end 9 projecting outwardly thereof to receive a drive wheel, not shown, is a drive axle 10 having its inner end connected with the usual drive worm or differential gear, not shown, positioned within the compartment 6. The portion of the axle 10, passing through the bearing compartment 8 has a sleeve or collar 11 mounted thereon and provided with a double ball race 12, in which track a plurality of ball bearings 13. The ball bearings are secured in place by two retaining rings 14 and 15 and a ball retainer spacer 16.

The bearing construction just described has its rear portion abutting the wall 17 of the bearing compartment and is secured therein by an adjusting nut 18 in threaded connection with a cap portion 19 engageable over the enlarged portion 7.

The cap 19 is secured in position by fastening bolts 20 engaging laterally directed flanges 21 and 22 formed on said enlargement and cap, respectively. The adjusting nut 18 is locked against accidental movement from adjusted position by a set screw or binding nut 23 carried by the cap and engageable with the periphery of the nut.

The adjusting nut 18 has its inner face annularly channeled or grooved as at 24 providing an annular rib 25 on its inner face near the bore thereof which is of a diameter greater than that of the axle 10 and has its peripheral wall inclined inwardly and outwardly. Mounted upon the axle 10, between the adjusting nut and bearing member, is a spinner 26 having its hub portion 27 tapered to correspond with the taper of the bore of the adjusting nut and having its outer face annularly channeled as at 28 to receive the rib 25 of the adjusting nut and provided with an annular rib 29 to engage in the annular groove 24 of the adjusting nut.

The spinner 26 rotates with the sleeve 11 and has a slight clearance between the portions thereof adjacent the retaining ring 15 and the adjusting nut 18, which clearance is approximately ten thousandths of an inch. However this clearance may be varied to suit the particular construction.

The bearing for the axle is constantly supplied with lubricant by a trough formed by a rib 30 preferably cast integral with the housing and having the inner end 31 thereof enlarged and positioned within the differential compartment 6 so that the lubricant splashed by the differential gear, not shown, will be deposited within the trough. The trough 30 is inclined downwardly and outwardly toward the axle bearing and has the outer end 32 thereof positioned juxta-pose said bearing to supply the lubricant thereto as will be readily obvious. All excess lubricant may be discharged from the bearing compartment through a passageway or opening 33' in the annular rib 33 to partly separate the bearing compartment 8 from the interior of the axle housing 5, see Figure 1.

The excess lubricant from the bearing compartment drains back into the differential compartment through an aperture or opening 34 in a rib 35, and positioned within the compartment 6 adjacent the opening 34 is a deflector 36 to prevent the lubricant within said apartment 6 splashing therefrom. The deflector 36 may be of any height and is preferably higher than the aperture 34 as depicted in Figure 1.

From the foregoing description taken in connection with the accompanying drawing it will be readily apparent to those skilled in the art to which an invention of this character appertains that I have provided a rear axle construction which will be strong, practical and efficient for the purpose decribed.

What I claim as my invention is:

1. An axle housing having a bearing compartment, a drive gear compartment, means for feeding lubricant splashed by a drive gear in said compartment to the bearing compartment, said means including a diagonally extending trough mounted on the inner face of and projecting into the housing and having its high end within the gear compartment and its low end within the bearing compartment, an overflow outlet for the bearing compartment positioned above the lowest portion of the bearing compartment to prevent all of the lubricant being discharged from said compartment, and an inlet leading into the gear compartment for the lubricant overflow from the bearing compartment.

2. An axle housing having a bearing compartment, a drive gear compartment, means for feeding lubricant splashed by a drive gear in said compartment to the bearing compartment, said means including a diagonally extending trough mounted on the inner side face of and projecting into the housing and having its high end within the gear compartment and its low end within the bearing compartment, an overflow outlet for the bearing compartment positioned above the lowest portion of the bearing compartment to prevent all of the lubricant being discharged from said compartment, an inlet leading into the gear compartment for the lubricant overflow from the bearing compartment, and a deflector adjacent said inlet.

In testimony whereof I affix my signature.

EVERETT J. COOK.